United States Patent [19]

Blue

[11] 4,124,463
[45] Nov. 7, 1978

[54] ELECTROLYTIC CELL

[75] Inventor: Archie H. Blue, Christchurch, New Zealand

[73] Assignees: Ross Derisley Wood; Roland Edgar; Alec Henry Taylor, all of St. Martin's Guernsey, Channel Islands; Margaret Elizabeth Pyke, Essex, England

[21] Appl. No.: 755,608

[22] Filed: Dec. 29, 1976

[51] Int. Cl.² ............................ C25B 1/02; C25B 9/00; C25B 9/02
[52] U.S. Cl. ................................ 204/129; 204/265; 204/277; 204/288
[58] Field of Search ............... 204/129, 246, 263, 265, 204/266, 269, 270, 277, 278, 275, 288, 289

[56] References Cited

U.S. PATENT DOCUMENTS

| | | | |
|---|---|---|---|
| 1,219,333 | 3/1917 | Kynaston | 204/149 X |
| 1,376,207 | 4/1921 | Jacobs | 204/265 X |
| 1,431,047 | 10/1922 | Ruben | 204/265 |
| 1,544,052 | 6/1925 | Avery | 204/149 X |
| 1,862,663 | 6/1932 | Curtis | 204/288 X |
| 2,000,815 | 5/1935 | Berl | 204/265 X |
| 3,192,138 | 6/1965 | Enk et al. | 204/246 X |
| 3,433,729 | 3/1969 | Proskuryakov et al. | 204/129 X |
| 3,518,036 | 6/1970 | Staats et al. | 204/129 X |

*Primary Examiner*—Arthur C. Prescott
*Attorney, Agent, or Firm*—Haseltine, Lake & Waters

[57] ABSTRACT

In the electrolytic production of hydrogen and oxygen, air is pumped through the cell while the electrolysis is in progress so as to obtain a mixture of air with the electrolytically produced hydrogen and oxygen.

5 Claims, 3 Drawing Figures

ELECTROLYTIC CELL

BACKGROUND AND BRIEF DESCRIPTION OF THE INVENTION

This invention relates to the production of gases which can be utilized primarily but not necessarily as a fuel.

To electrically decompose water it is necessary to pass direct current between a pair of electrodes which are immersed in a suitable electrolyte. It is normal in such electrolysis to place some form of gas barrier between the two electrodes in order to prevent the gases evolved during the electrolysis from forming an explosive mixture. However provided suitable precautions are taken it has been found that the gases can be allowed to mix and can be fed into a storage tank for subsequent use. Because the gases when mixed form an explosive mixture, it is possible for the mixture to be utilized for instance as a fuel for an internal combustion engine. In such circumstances it is desirable that the gases should also be mixed with a certain proportion of air in order to control the explosive force which results when the gases are ignited.

One of the difficulties encountered with electrolysis is that bubbles of gas are liable to remain on the electrodes during the electrolysis thus effectively limiting the area of electrode which is in contact with the electrolyte and preventing optimum current flow between the electrodes. Because in accordance with the present invention it is desirable that the gases evolved during the electrolysis be mixed with air, then it is possible for air to be passed through the cell while the electrolysis is in progress. The passage of air through the cell can be directed past the electrodes so as to entrain in the passage of air any bubbles of gas remaining on the electrodes.

Accordingly the invention comprises an electrolytic cell including a gas tight casing, a plurality of electrodes adapted to be supported on a central post within the cell in a spaced apart relationship and to be electrically insulated from each other, each alternative electrode being adapted to be connected to a positive direct current source or a negative direct current source respectively and wherein the central post is in the form of a tube, one end of which is extended out of the cell and is adapted to be connected to a source of air under pressure, with the other end of the central post terminating in an air outlet below the said electrodes, the said cell including a gas outlet to exhaust air forced into the cell through the central post and to exhaust the electrolytically produced gases mixed with the said air.

DETAILED DESCRIPTION OF THE INVENTION

Figure 1:
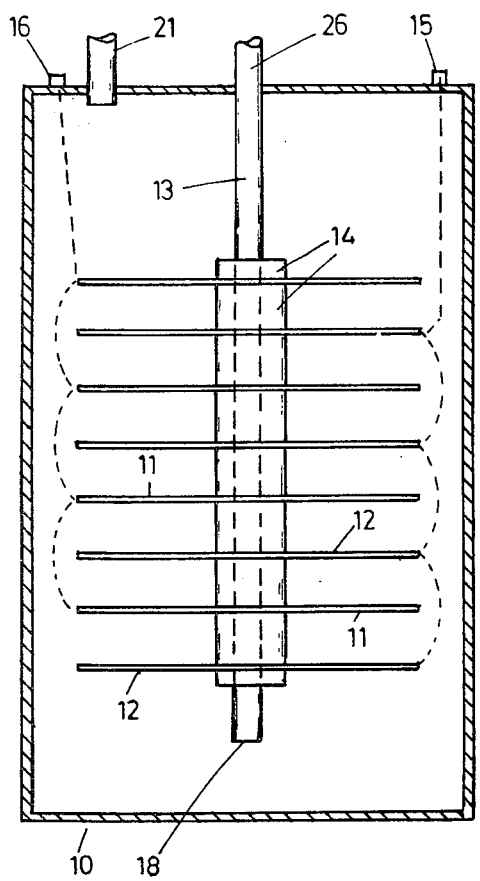
Figure 2:
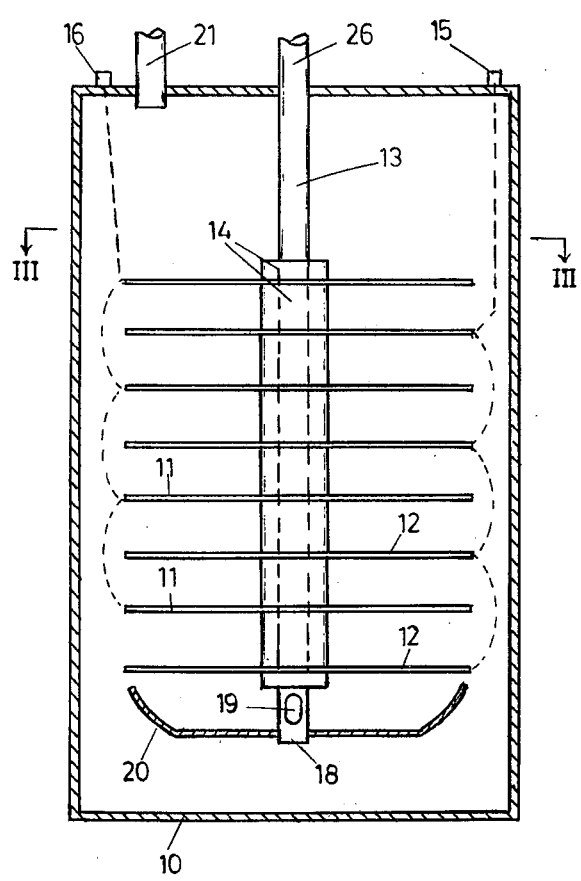
Figure 3:
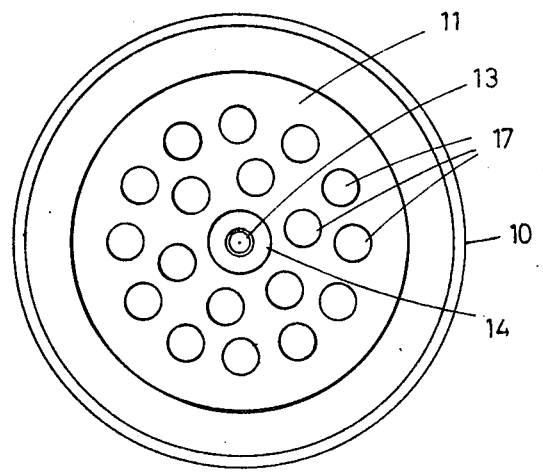

Various forms of the invention will now be described with the aid of the accompanying drawings wherein:

FIG. 1 is a diagrammatic elevational view partly in section of one form of the invention, FIG. 2 is a diagrammatic elevational view partly in section of a modified form of the invention, FIG. 3 is a section along the line III—III of FIG. 2.

The cell as shown in FIG. 1 comprises a gas-tight casing 11 which is formed from a non-corrodible material such as a plastics material as is known in the art. A plurality of cathodes 11 and a plurality of anodes 12 are supported within the cell by means of an electrically insulating central post 13, with the cathodes and anodes being spaced apart by means of insulating spacers 14. The anodes 12 are all connected in parallel to a positive terminal post 15 while the cathodes are all connected in parallel to the negative terminal post 16, these connections being indicated in dotted lines in the drawings. The cathodes and the anodes are preferably in the form of disc like plates of a suitable metal which is consistent with the composition of the electrolyte utilized so as to ensure a satisfactory life to the cell. The plates may be shaped to conform with the shape of the walls of the cell which may be circular in cross section as indicated or any other desired shape.

The central post 13 is preferably in the form of a tube which extends out of the cell as at 13a. The lower end 18 of the tube is open so that air can be pumped into the cell through the central post 13 and enter the cell via the lower end 18 where it will pass up through the electrolyte. This will keep the electrolyte constantly in motion and thereby assist in the rapid removal from the electrodes of any gases that might be adhering thereto.

In the modification shown in FIG. 2 and 3, the electrodes are each provided with holes 17 and in such a case the central post 13 is preferably formed with at least one air hole 19 adjacent the lower end 18 thereof. A deflector plate 20 is also supported by the central post 13, this plate being dish shaped so as to deflect air issuing out of the air hole 19 up through the holes 17 in the electrodes. Such action further assists in dislodging any bubbles of gas clinging to the electrodes.

The cell also includes a gas outlet 21 so that the air which enters the cell together with the gases produced by the electrolysis can be exhausted out of the cell into a suitable storage tank (not shown in the drawings). If desired such storage tank can be arranged to accept the gases under pressure and for this purpose the air pumped into the cell will be pumped in under the required pressure. A gas drier (not shown in the drawings) can also be interposed between the gas outlet 21 and the storage tank.

Although the electrolysis will naturally produce considerable heat, nevertheless it can be found advantageous to install a heater in the cell, preferably in the bottom of the cell, to assist and facilitate the warming up of the electrolyte so that the cell reaches its most efficient operating conditions as quickly as possible.

Preferably also, current limiting means as is known in the art are employed so that the intensity of the electrolytic action can be controlled.

Means may also be provided for the automatic replenishment of water within the cell as the level of the electrolyte drops during use.

While it is recognized that the mixing of hydrogen and oxygen will create a dangerous explosive mixture, nevertheless by carrying out the invention as hereinbefore described the risk of explosion is minimized. The gases produced can be utilized for instance as a fuel to power an internal combustion engine and for this purpose it is desirable, as beforementioned, to mix with the gases evolved during the electrolysis a proportion of air so that when the mixture is ignited within the cylinder or cylinders of the engine, the explosive force so created can be of the desired amount.

While in the foregoing description reference is made to the utilization of the mixed gases as a fuel, it will of course be understood that the gases can be separated for individual use by techniques as known in the art.

What is claimed is:

1. A process for producing by electrolysis of an aqueous liquid a combustible mixture of hydrogen and oxygen, comprising: electrolyzing the aqueous liquid into hydrogen and oxygen in an electrolytic cell having a gas-tight casing, a substantially central tubular post mounted in the casing and having an air inlet at its upper end, and a plurality of electrodes supported on the post and axially spaced therealong, alternate electrodes being connected to a first electrical terminal and to a second electrical terminal respectively connected to a respective poles of a current source and being mutually insulated, the post having an air outlet below the electrodes out of which flows air from the air inlet into the cell and over the electrodes; and a source of air under pressure connected to the said air inlet forcing a flow of air through the aqueous liquid contained in the cell in operation thereof; the cell having in its upper region a common outlet exhausting the combustible mixture comprising air forced through the cell and hydrogen produced by electrolysis of said liquid in said cell.

2. The process according to claim 1 wherein the electrodes are discs each having a plurality of holes therethrough.

3. The process according to claim 1 further including a dish-shaped air deflector plate supported on the said post below the said air outlet.

4. Apparatus for producing by electrolysis of an aqueous liquid a combustible mixture of hydrogen and oxygen, comprising: an electrolytic cell having a gas-tight casing, a substantially central tubular post mounted in the casing and having an air inlet at its upper end, and a plurality of electrodes supported on the post and axially spaced therealong, alternate electrodes being connected to a first electrical terminal and to a second electrical terminal respectively for connection to respective poles of a current source and being mutually insulated, the post having an air outlet below the electrodes for flow of air from the air inlet into the cell and over the electrodes; a dish-shaped air deflector supported on said post below said air outlet; and a source of air under pressure connected to the said air inlet for forcing a flow of air through the aqueous liquid contained in the cell in operation thereof; the cell having in its upper region a common outlet for exhausting the combustible mixture comprising air forced through the cell and hydrogen and oxygen produced by electrolysis of said liquid in said cell.

5. The apparatus according to claim 4 wherein the electrodes are discs each having a plurality of holes therethrough.

* * * * *